United States Patent
Guo

(10) Patent No.: US 10,160,852 B2
(45) Date of Patent: Dec. 25, 2018

(54) POLYMER BLEND, A FILM OR SHEET MADE THEREFROM, ARTICLES MADE FROM THE FILM OR SHEET OR PIPE AND METHOD OF PREPARING A FILM OR SHEET

(71) Applicant: Rohm and Haas Company, Philadelphia, PA (US)

(72) Inventor: Hailan Guo, Warrington, PA (US)

(73) Assignee: Rohm and Haas Company, Collegeville, PA (US)

( * ) Notice: Subject to any disclaimer, the term of this patent is extended or adjusted under 35 U.S.C. 154(b) by 101 days.

(21) Appl. No.: 15/521,365

(22) PCT Filed: Oct. 20, 2015

(86) PCT No.: PCT/US2015/056389
§ 371 (c)(1),
(2) Date: Apr. 24, 2017

(87) PCT Pub. No.: WO2016/064823
PCT Pub. Date: Apr. 28, 2016

(65) Prior Publication Data
US 2017/0253734 A1 Sep. 7, 2017

Related U.S. Application Data

(60) Provisional application No. 62/066,476, filed on Oct. 21, 2014.

(51) Int. Cl.

| | |
|---|---|
| *C08L 27/06* | (2006.01) |
| *C08J 5/18* | (2006.01) |
| *F16L 9/12* | (2006.01) |
| *C08F 285/00* | (2006.01) |
| *C08L 51/00* | (2006.01) |
| *B29C 43/00* | (2006.01) |
| *B29C 43/24* | (2006.01) |
| *B29C 45/00* | (2006.01) |
| *B29C 47/00* | (2006.01) |
| *C08J 3/22* | (2006.01) |
| *B29K 27/06* | (2006.01) |
| *B29K 33/00* | (2006.01) |

(52) U.S. Cl.
CPC ............ *C08L 27/06* (2013.01); *B29C 43/003* (2013.01); *B29C 43/24* (2013.01); *B29C 45/0001* (2013.01); *B29C 47/0004* (2013.01); *B29C 47/0021* (2013.01); *B29C 47/0023* (2013.01); *C08F 285/00* (2013.01); *C08J 3/22* (2013.01); *C08J 5/18* (2013.01); *C08L 51/003* (2013.01); *F16L 9/12* (2013.01); *B29K 2027/06* (2013.01); *B29K 2033/00* (2013.01); *C08J 2327/06* (2013.01); *C08J 2351/06* (2013.01); *C08J 2427/06* (2013.01); *C08J 2433/12* (2013.01); *C08J 2451/06* (2013.01); *C08L 2203/18* (2013.01); *C08L 2207/53* (2013.01)

(58) Field of Classification Search
CPC .... C08L 27/06; C08L 51/003; C08L 2203/18; C08L 2207/53; C08J 5/18; C08J 3/22; C08J 2327/06; C08J 2433/12; C08J 2351/06; C08J 2427/06; C08J 2451/06; F16L 9/12; C08F 285/00; B29C 43/003; B29C 43/24; B29C 45/0001; B29C 47/0004; B29C 47/0021; B29C 47/0023; B29K 2027/06; B29K 2033/00
See application file for complete search history.

(56) References Cited

U.S. PATENT DOCUMENTS

| | | |
|---|---|---|
| 2011/0257306 A1 | 10/2011 | Bodart et al. |
| 2013/0053544 A1 | 2/2013 | Howarth |
| 2013/0116382 A1 | 5/2013 | Kisin et al. |

FOREIGN PATENT DOCUMENTS

| | | |
|---|---|---|
| CN | 1622961 A | 6/2005 |
| EP | 1 834 988 | 9/2007 |
| WO | WO03/062292 | 7/2003 |
| WO | WO2009/138314 | 11/2009 |
| WO | WO2012131328 | 10/2012 |
| WO | WO2014/035608 | 3/2014 |

OTHER PUBLICATIONS

Taiwan Divisional Office Action dated May 21, 2018; from counterpart Taiwan Divisional Application No. 106112547.
Taiwan Divisional Office Action dated Nov. 15, 2015; from counterpart Taiwan Divisional Application No. 106112547.
PCT Search Report dated Jan. 14, 2016; from PCT counterpart Application No. PCT/US2015/056389.
PCT IPRP dated Apr. 25, 2017; from PCT counterpart Application No. PCT/US2015/056389.
EP Office Action dated Jun. 26, 2017; from EP counterpart Application No. 15791415.1.
Chinese Office Action dated Oct. 17, 2018; from counterpart Chinese Application No. 201580054883.7.

*Primary Examiner* — Michael C Miggins

(57) ABSTRACT

A polymer blend comprising from 20 to 90 parts by weight, based on the total weight of the polymer blend, polyvinyl chloride resin; and from 10 to 80 parts by weight, based on the total weight of the polymer blend, a flexible acrylic polymer is provided. Also provided are films or sheets or pipe made from the polymer blend, a capstock made from the film and a method for preparing a film.

15 Claims, No Drawings

US 10,160,852 B2

POLYMER BLEND, A FILM OR SHEET MADE THEREFROM, ARTICLES MADE FROM THE FILM OR SHEET OR PIPE AND METHOD OF PREPARING A FILM OR SHEET

FIELD OF DISCLOSURE

The disclosure relates to a polymer blend, a film or sheet or pipe made therefrom, articles made from the film or sheet and method of preparing a film or sheet.

BACKGROUND OF THE DISCLOSURE

Polyvinyl chloride (PVC) is a versatile material which has been used in a variety of market segments, ranging from building constructions, medical and consumer care, commercial graphic printing to interior or exterior decoration for automobile, residential and commercial buildings. In order to improve the flexibility of PVC material, plasticizers are typically incorporated into PVC formulations. However, plasticizers typically used in flexible PVC formulations are phthalate compounds, and often migrate out over time.

Alternative additives which would provide mechanical strength, flexibility, dimensional stability, and weatherability would be useful in the field.

SUMMARY OF THE DISCLOSURE

The disclosure is for a polymer blend, film or sheet or pipe made therefrom, articles made from the film or sheet or pipe and method of preparing a film or sheet.

In one embodiment, the disclosure provides a polymer blend which comprises (1) from 20 to 90 parts by weight, based on the total weight of the polymer blend, polyvinyl chloride resin; and (2) from 10 to 80 parts by weight, based on the total weight of the polymer blend, a flexible acrylic polymer which comprises (a) a crosslinked core which comprises greater than 95 weight percent of units derived from one or more monomers selected from the group consisting of alkyl (meth)acrylate monomers, from 0.1 to 5 weight percent of units derived from a cross-linking monomer, or graft-linking monomer, or combination thereof, and wherein the crosslinked core has a Tg of from −85 to −10° C.; (b) an intermediate region which comprises one or more intermediate layers, wherein each of the intermediate layers comprises from 88.5 to 100 weight percent of units derived from a one or more monomers selected from the group consisting of alkyl (meth)acrylate monomers, from 0 to 5 weight percent of units derived from a cross-linking monomer, or a graft-linking monomer, or a combination of two or more thereof, optionally from 0 to 2.0 weight percent units derived from one or more chain transfer agents; wherein there is a compositional gradient between the intermediate layers and said compositional gradient transitions between a lower Tg and an upper Tg, wherein said lower Tg is at least −30° C. and said upper Tg is 70° C. or less, and (c) an outermost layer which comprises from 98.5 to 100 weight percent units derived from one or more monomers selected from the group consisting of alkyl (meth)acrylate, styrenic monomers, and combinations of two or more thereof, from 0 to 1.5 weight percent units derived from one or more chain transfer agents, and has a Tg of from 40° C. to 110° C.

In another embodiment, the disclosure provides a film or sheet, or pipe produced from any embodiment of the polymer blend disclosed herein.

In yet another aspect, the disclosure provides a capstock prepared from any embodiment of the film or sheet disclosed herein.

In another embodiment, the disclosure provides a method of preparing a film or sheet, or pipe comprising selecting a polymer blend which comprises (1) from 20 to 90 percent by weight, based on the total weight of the polymer blend, polyvinyl chloride resin; and (2) from 10 to 80 percent by weight, based on the total weight of the polymer blend, a flexible acrylic polymer which comprises (a) a crosslinked core which comprises greater than 95 weight percent of units derived from one or more monomers selected from the group consisting of alkyl (meth)acrylate monomers, from 0.1 to 5 weight percent of units derived from a cross-linking monomer, or graft-linking monomer, or combination thereof, and wherein the crosslinked core has a Tg of from −85 to −10° C.; (b) an intermediate region which comprises one or more intermediate layers, wherein each of the intermediate layers comprises from 88.5 to 100 weight percent of units derived from a one or more monomers selected from the group consisting of alkyl (meth)acrylate monomers, from 0 to 5 weight percent of units derived from a cross-linking monomer, a graft-linking monomer, or a combination of two or more thereof, optionally from 0 to 2.0 weight percent units derived from one or more chain transfer agents; wherein there is a compositional gradient between the intermediate layers and said compositional gradient transitions between a lower Tg and an upper Tg, wherein said lower Tg is at least −30° C. and said upper Tg is 70° C. or less, and (c) an outermost layer which comprises from 98.5 to 100 weight percent units derived from one or more monomers selected from the group consisting of alkyl (meth)acrylate, styrenic monomers, and combinations of two or more thereof, from 0 to 1.5 weight percent units derived from one or more chain transfer agents, and has a Tg of from 40° C. to 110° C.; and forming the polymer blend into a film or sheet, or pipe by one or more process selected from the group consisting of calendaring, cast extrusion and injection molding.

DETAILED DESCRIPTION OF THE DISCLOSURE

The disclosure provides a polymer blend, a film or sheet, or pipe made therefrom, articles made from the film or sheet and method of preparing a film or sheet, or pipe.

As used herein, polyvinyl chloride resin means any polymer comprising units derived from vinyl chloride.

As used herein, the term "(meth)acrylate" means acrylate or methacrylate.

As used herein, the term "film or sheet" means a polymeric sheet that is less than about 0.50 mm thick.

The disclosure provides a polymer blend, film or sheet, capstock formed from the film or sheet and method of preparing a film or sheet wherein the polymer blend which comprises from 20 to 90 parts by weight, based on the total weight of the polymer blend, polyvinyl chloride resin; and from 10 to 80 parts by weight, based on the total weight of the polymer blend, of a flexible acrylic polymer. All individual values and subranges from 20 to 90 parts by weight polyvinyl chloride resin are included and disclosed herein; for example, the amount of polyvinyl chloride resin may range from a lower limit of 20, 40, 60 or 80 parts by weight to an upper limit of 30, 50, 70 or 90 parts by weight, based on the total weight of the polymer blend. For example, the weight of polyvinyl chloride resin in the polymer blend may be from 20 to 90 parts by weight, or in the alternative, from 20 to 60 parts by weight, or in the alternative, from 50 to 90 parts by weight, or in the alternative, from 40 to 70 parts by weight. All individual values and subranges from 10 to 80 parts by weight flexible acrylic polymer are included and disclosed herein; for example, the amount of flexible acrylic polymer in the polymer blend may range from a lower limit of 10, 30, 50, 60 or 70 parts by weight to an upper limit of 20, 40, 60 or 80 parts by weight, based on the total weight of the polymer blend. For example, the amount of flexible acrylic polymer in the polymer blend can range from 10 to 80 parts by weight, or in the alternative, from 10 to 50 parts by weight, or in the alternative, from 40 to 80 parts by weight, or in the alternative, from 20 to 70 parts by weight.

Exemplary polyvinyl chloride resins include those sold under the name FORMOLON which are commercially available from Formosa Plastics Corporation, U.S.A. (Livingston, N.J., USA); or under the name OXYVINYLS, which are commercially available from Occidental Petroleum Corporation, U.S.A (Houston, Tex., USA). In some embodiments, the PVC resin may be blended with conventional additives, such as heat stabilizers, lubricants, plasticizers, fillers, processing aids, impact modifiers, UV and light stabilizers, dye and pigments.

The flexible acrylic polymer comprises a crosslinked core which comprises greater than 95 weight percent (wt %) of units derived from one or more monomers selected from the group consisting of alkyl (meth)acrylate monomers, from 0.1 to 5 weight percent of units derived from a cross-linking monomer, graft-linking monomer, or combination thereof, and wherein the crosslinked core has a Tg of from −85 to −10° C. All individual values and subranges from greater than 95 weight percent units derived from one or more monomers selected from the group consisting of alkyl (meth)acrylate monomers are included and disclosed herein. For example, the units derived from one or more alkyl (meth)acrylate monomers can be greater than 95 wt %, or in the alternative, from greater than 96 wt %, or in the alternative, from greater than 97 wt %, or in the alternative, from greater than 98 wt %, or in the alternative, from greater than 99 wt %. Exemplary alkyl (meth)acrylate monomers include $C_1$-$C_{18}$ (meth)acrylate monomer units and combinations thereof, including, but not limited to, butyl acrylate, ethylacrylate, 2-ethyl hexyl acrylate, propyl acrylate, methyl acrylate, hexyl acrylate, butylmethacrylate, methylmethacrylate, ethylhexyl methacrylate, stearyl acrylate, benzyl acrylate, blends thereof, and combinations thereof.

The crosslinked core of the flexible acrylic polymer further comprises from 0.1 to 5 weight percent of units derived from a cross-linking monomer, or graft-linking monomer, or combination thereof. All individual values and subranges from 0.1 to 5 wt % are included and disclosed herein; for example, the amount of units derived from a cross-linking monomer, or graft-linking monomer, or combination thereof may range from a lower limit of 0.1, 0.5, 1, 3 or 4 wt % to an upper limit of 0.2, 0.7, 2, 4 or 5 wt %. For example, the amount of units derived from a cross-linking monomer, or graft-linking monomer, or combination thereof may range from 0.1 to 5 wt %, or in the alternative, from 0.1 to 2.5 wt %, or in the alternative, from 2.4 to 5 wt %, or in the alternative, from 1 to 3 wt %. Exemplary, but non-limiting, cross-linking monomers and/or graft-linking monomers useful in the crosslinked core include butanediol di(meth)acrylate, ethylene glycol di(meth)acrylate, divinyl benzene, diethylene glycol di(meth)acrylate, diallyl maleate, allyl methacrylate, diallyl phthalate, triallyl phthalate, trimethylolpropane tri(meth)acrylate, blends thereof and combinations of two or more thereof. In a particular embodiment, the crosslinked core comprises at least 95 weight percent units of butyl acrylate and from 0.1 to 5.0 weight percent units of a combination of butanediol diacrylate and allyl methacrylate.

The crosslinked core of the flexible acrylic polymer has a Tg from −85 to −10° C. All individual values and subranges from −85 to −10° C. are included and disclosed herein; for example, the Tg of the crosslinked core may range from a lower limit of −85, −65, −45, −25 or −15° C. to an upper limit of −10, −30, −50, −70 or −80° C. For example, the Tg of the crosslinked core may range from −10 to −85° C., or in the alternative, from −10 to −50° C., or in the alternative, from −45 to −75° C., or in the alternative, from −25 to −75° C.

The flexible acrylic polymer further comprises an intermediate region which comprises one or more intermediate layers, wherein each of the intermediate layers comprises from 88.5 to 100 weight percent of units derived from a one or more monomers selected from the group consisting of alkyl (meth)acrylate monomers, from 0 to 5 weight percent of units derived from a cross-linking monomer, or a graft-linking monomer, or a combination of two or more thereof, optionally from 0 to 2.0 weight percent units derived from one or more chain transfer agents; wherein there is a compositional gradient between the intermediate layers and said compositional gradient transitions between a lower Tg and an upper Tg, wherein said lower Tg is at least −30° C. and said upper Tg is 70° C. or less.

The intermediate layers comprises from 88.5 to 100 weight percent of units derived from a one or more monomers selected from the group consisting of alkyl (meth) acrylate monomers. All individual values and subranges from 88.5 to 100 wt % units derived from a one or more alkyl (meth)acrylate monomers are included and disclosed herein; for example, the amount of units derived from one or more alkyl (meth)acrylate monomers in the intermediate layers may range from a lower limit of 88.5, 90, 92, 94, 96, 98 or 99.5 wt % to an upper limit of 88.7, 91, 93, 95, 97, 99 or 100 wt %. For amount of units derived from one or more alkyl (meth)acrylate monomers in the intermediate layers may be from 88.5 to 100 wt %, or in the alternative, from 88.5 to 95 wt % or in the alternative, from 94 to 100 wt %, or in the alternative, from 91 to 99 wt %. Exemplary, but non-limiting, alkyl (meth)acrylate monomers useful in the intermediate layers include butyl acrylate, ethyl hexyl acrylate, ethyl acrylate, methyl methacrylate, cyclohexyl (meth) acrylate, cyclopentyl methacrylate, tetrahydrofurfyl methacrylate, and benzyl (meth)acrylate. In a particular embodiment, the disclosure provides the polymer blend, film or sheet, or pipe made therefrom, article prepared from the film or sheet and method of preparing a film or sheet, or pipe according to any embodiment disclosed herein except that the intermediate region comprises one or more layers comprising units derived from butyl acrylate and methyl methacrylate. In another embodiment, the disclosure provides the polymer blend, film or sheet, or pipe made therefrom, article prepared from the film or sheet and method of preparing a film or sheet, or pipe according to any embodiment disclosed herein except that the intermediate region comprises one or more layers comprising units derived from ethyl acrylate and methyl methacrylate.

The intermediate layers further comprise from 0 to 5 weight percent of units derived from a cross-linking monomer, or a graft-linking monomer, or a combination of two or more thereof. All individual values and subranges from 0 to 5 wt % units derived from a cross-linking monomer, or a graft-linking monomer, or a combination of two or more thereof are included and disclosed herein; for example, the amount of units derived from a cross-linking monomer, or a graft-linking monomer, or a combination of two or more thereof may range from a lower limit of 0, 1, 3, or 4 wt % to an upper limit of 0.5, 2, 3.5 or 5 wt %. For example, the amount of units derived from a cross-linking monomer, or a graft-linking monomer, or a combination of two or more thereof can be from 0 to 5 wt %, or in the alternative, from 0 to 2.5 wt %, or in the alternative, from 2.5 to 5 wt %, or in the alternative, from 1 to 4 wt %. Exemplary, but non-limiting, cross-linking monomers and/or graft-linking monomers useful in the intermediate layers include butanediol di(meth)acrylate, ethylene glycol di(meth)acrylate, divinyl benzene, diethylene glycol di(meth)acrylate, diallyl maleate, allyl methacrylate, diallyl phthalate, triallyl phthalate, trimethylolpropane tri(meth)acrylate, blends thereof and combinations of two or more thereof.

The intermediate layers further optionally comprise from 0 to 2.0 weight percent units derived from one or more chain transfer agents. All individual values and subranges from 2 to 2.0 wt % units derived from one or more chain transfer agents are included and disclosed herein; for example, the amount of units derived from one or more chain transfer agents can range from a lower limit of 0, 0.5, 1 or 1.5 wt % to an upper limit of 0.25, 0.75, 1.25, 1.5 or 2 wt %. For example, the amount of units derived from one or more chain transfer agents can range from 0 to 2.0 wt %, or in the alternative, from 0 to 1 wt %, or in the alternative, from 1 to 2 wt %, or in the alternative, from 0.75 to 1.75 wt %. Exemplary, but non-limiting, chain transfer agents useful in the intermediate layers include alkyl mercaptans, such as ethyl mercaptan, n-propyl mercaptan, n-butyl mercaptan, isobutyl mercaptan, t-amyl mercaptan, n-hexyl mercaptan, cyclohexyl mercaptan, n-octyl mercaptan, n-decyl mercaptan, n-dodecyl mercaptan; mercapto-group-containing acids, such as 3-mercaptoproprionic acid; 2-hydroxyethyl mercaptan; alcohols, such as isopropanol, isobutanol, lauryl alcohol, and t-octyl alcohol; and halogenated compounds, such as carbon tetrachloride, tetrachloroethylene, and trichlorobromoethane.

The intermediate region is further characterized in that there is a compositional gradient between the intermediate layers and said compositional gradient transitions between a lower Tg and an upper Tg, wherein said lower Tg is at least −30° C. and said upper Tg is 70° C. or less. All individual values and subranges for each of the lower Tg and upper Tg are included and disclosed herein. For example, the lower Tg can be −30° C., or in the alternative, −20° C., or in the alternative, −10° C. The upper Tg can be 70° C., or in the alternative, 60° C., or in the alternative, 50° C. That is, the change in Tg over the composition gradient of the intermediate region (ΔTg) can be from greater than 0° C. to 100° C. All individual values and subranges of ΔTg from greater than 0 to 100° C. are included and disclosed herein; for example, the ΔTg can be from a lower limit of greater than 0, 20, 40, 60 or 80° C. to an upper limit of 10, 30, 50, 70, 90 or 100° C. For example, the ΔTg can be from greater than 0 to 100° C., or in the alternative, from greater than 0 to 50° C., or in the alternative, from 50 to 100° C., or in the alternative, from 25 to 75° C.

The flexible acrylic polymer further comprises an outermost layer which comprises from 98.5 to 100 weight percent units derived from one or more monomers selected from the group consisting of alkyl (meth)acrylate, styrenic monomers, and combinations of two or more thereof, from 0 to 1.5 weight percent units derived from one or more chain transfer agents, and has a Tg of from 40° C. to 110° C. All individual values and subranges from 98.5 to 100 wt % units derived from one or more monomers selected from the group consisting of alkyl (meth)acrylate, styrenic monomers, and combinations of two or more thereof are included and disclosed herein. For example, the amount of units derived from one or more monomers selected from the group consisting of alkyl (meth)acrylate, styrenic monomers, and combinations of two or more thereof can range from a lower limit of 98.5, 99, or 99.5 wt % to an upper limit of 98.75, 99.25, 99.75 or 100 wt %. For example, the amount of units derived from one or more monomers selected from the group consisting of alkyl (meth)acrylate, styrenic monomers, and combinations of two or more thereof can range from 98.5 to 100 wt %, or in the alternative, from 98.5 to 99.5 wt %, or in the alternative, from 99.5 to 100 wt %, or in the alternative, from 98.75 to 99.75 wt. Exemplary, but non-limiting, alkyl (meth)acrylate monomers useful in the outer layer include butyl acrylate, ethyl hexyl acrylate, ethyl acrylate, and methyl methacrylate. In a particular embodiment, the outermost layer comprises greater than 95 weight percent units derived from a combination of ethyl acrylate and methyl methacrylate monomers. Exemplary, but non-limiting, styrenic monomers useful in the outer layer include styrene, α-methylstyrene, and vinyl toluene.

The outer layer of the flexible acrylic polymer further comprises from 0 to 1.5 weight percent units derived from one or more chain transfer agents. All individual values and subranges from 0 to 1.5 wt % units derived from one or more chain transfer agents are included and disclosed herein. For example, the amount of units derived from one or more chain transfer agents in the outer layer can range from a lower limit of 0, 0.5 or 1 wt % to an upper limit of 0.25, 0.75, 1.25 or 1.5 wt %. For example, the amount of units derived from one or more chain transfer agents in the outer layer can be from 0 to 1.5 wt %, or in the alternative, from 0 to 0.75 wt %, or in the alternative, from 0.75 to 1.5 wt %, or in the alternative, from 0.25 to 1.25 wt %.

The outer layer of the flexible acrylic polymer has a Tg of from 40° C. to 110° C. All individual values and subranges from 40° C. to 110° C. All individual values and subranges from 40° C. to 110° C. are included and disclosed herein; for example, the Tg of the outer layer of the flexible acrylic polymer can range from a lower limit of 40, 60, 80 or 100° C. to an upper limit of 50, 70, 90 or 110° C. For example, the Tg of the outer layer can be from 40 to 110° C., or in the alternative, from 40 to 77° C., or in the alternative, from 76 to 110° C., or in the alternative, from 60 to 90° C.

Method of preparing flexible acrylic polymers having an intermediate region as described herein are described, for example, in U.S. Patent Application Publication 2013/053544, the disclosure of which is incorporated herein by reference.

In a particular embodiment, the disclosure provides the polymer blend, film or sheet or pipe made therefrom, article prepared from the film or sheet, and method of preparing a film or sheet or pipe according to any embodiment disclosed herein, except that the flexible acrylic polymer exhibits one or more of the following properties: (a) a Tg of from 50 to 97° C. of the outermost layer; and (b) a Tg of from −55 to −30° C. of the crosslinked core.

Film or sheet may be produced from any embodiment of the polymer blend disclosed herein. Production methods for making film or sheet or pipe are known and include, for example, calendaring, (cast) extrusion and injection molding.

Pipe may be produced from any embodiment of the polymer blend disclosed herein. Any suitable production method for making polymer pipe may be used, including, for example, extrusion and injection molding.

A typical capstock can be from 0.1 to 1.0 mm thick, whereas the structural plastic can be about 0.8 to 1.2 mm thick for PVC siding applications, and from 1.2 to 3.0 mm for PVC profile applications (e.g., PVC window frames, fencing, decking, and rain gutters).

EXAMPLES

The following examples illustrate the present invention but are not intended to limit the scope of the invention.

Table 1 provides the composition of components used in preparing the Examples.

TABLE 1

| Mixture | Component | Parts by Weight |
|---|---|---|
| A | Water | 385 |
|   | 23% Aqueous sodium dodecylbenzenesulfonate | 2.5 |
| B | 0.2% Aqueous iron sulfate heptahydrate | 1.21 |
|   | 0.5% Aqueous ethylenediaminetetracetic acid | 1.02 |
|   | Water | 5 |
| C | Butyl acrylate | 124.4 |
|   | 1,3-Butanediol diacrylate | 1.26 |
|   | Allyl methacrylate | 0.63 |
|   | 23% Aqueous sodium dodecylbenzenesulfonate | 3.9 |
|   | Water | 35 |
| D | 70% aqueous tert-butylhydroperoxide | 0.38 |
|   | Water | 14.8 |
| E | Sodium hydroxymethanesulfinate hydrate | 0.47 |
|   | Water | 23.8 |
| F | Butyl acrylate | 80.9 |
|   | Methyl methacrylate | 43.6 |
|   | Allyl methacrylate | 0.63 |
|   | 23% Aqueous sodium dodecylbenzenesulfonate | 3.8 |
|   | Water | 35 |
| G | Ethyl acrylate | 2.15 |
|   | Methyl methacrylate | 51.4 |
|   | 1-dodecanethiol | 0.22 |
|   | 23% Aqueous sodium dodecylbenzenesulfonate | 2.3 |
|   | Water | 13.5 |
| H | Ethyl acrylate | 2.15 |
|   | Methyl methacrylate | 51.4 |
|   | 1-dodecanethiol | 0.92 |
|   | 23% Aqueous sodium dodecylbenzenesulfonate | 2.3 |
|   | Water | 13.5 |

Inventive Flexible Acrylic Polymer Example 1

A reactor equipped with a stirrer and condenser and blanked with nitrogen was charged with Mixture A. Into the stirred reactor at 85° C. were added Mixture B, 7% of Mixture C, 1.7% of Mixture D and 10.4% of Mixture E. After an exothermic reaction took place and the reactor reached peak temperature, the heating and stirring were continued at 85° C. for 5 minutes. The remainder of Mixture C and 8.7% of Mixture D were gradually added to the reactor over 90 minutes. After the addition was complete, the reactor was kept at 85° C. for 15 minutes. 24.3% of Mixture E was added to the reactor. Mixture F and 24.3% of Mixture D were gradually added to the reactor over 90 minutes. After the addition was complete, the reactor was held at 85° C. for 15 minutes. 21.9% of Mixture E was added to the reactor. Mixture G and 21.9% of Mixture D were gradually added to the reactor over 60 minutes. After the addition was complete, the reactor was held at 85° C. for 15 minutes. The remainder of Mixture E was added to the reactor. Mixture H and the remainder of Mixture D were gradually added to the reactor over 60 minutes. After the addition was complete, the reactor was held at 85° C. for 15 minutes, then cooled to ambient temperature.

Inventive Flexible Acrylic Polymer Example 1 had an average particle size of 200 nm, a solids content of 39.3%, and a weight average molecular weight of 42,400

The emulsion prepared from Inventive Flexible Acrylic Polymer Example 1 above was freeze dried with a vacuum oven, and the resultant powder along with a PVC Masterbatch at the ratio listed in Table 2 were mixed with a Henschel Blender (available from Henschel Mixers Americas, Houston, Tex.).

Preparation of PVC Masterbatch (PVC MB): PVC resin Formolon 614 from Formosa Plastics (100 phr), Advastab TM-181 (2.0 phr), Advalube F-1005 (0.8 phr), and Advalube E-2107 (0.2 phr), Dow Chemical Company. The ingredients were mixed with a Henschel Blender (available from Henschel Mixers Americas, Houston, Tex.).

The PVC Masterbatch, in the absence of any Flexible Acrylic Polymer, was used to make Comparative Sheet Example 1.

Inventive Sheet Examples 1 and 2 were prepared by blending the PVC MB with Inventive Flexible Acrylic Polymer Example 1 (FA) in the ratios shown in Table 2. The PVC MB and FA blend were made by shaking the components of the powder blends in a bag.

Preparation of Inventive Sheet Examples. The blended PVC MB and FA (for Inventive Examples) or PVC MB (for Comparative Example) was first milled using a Collin Mill (W. H. Collin GmbH Maschienefabrik, Aichach, Germany) at 190° C. for 3 minutes. After the milling was completed, the molten polymer was stripped from the metal rolls and placed in a metal mold to press into plaques with a thickness of ⅛ inch. A CARVER press (Carver Press Inc., Menomonee Falls, Wis.) was used with an operating temperature of 190° C. and pressing conditions of 2.268 tons for 3 minutes, followed by 9.07 tons for 2 minutes, and a 5-minute cooling period (room temperature) at 9.07 tons.

The mechanical properties of the Comparative and Inventive Sheet Examples are shown in Table 2.

TABLE 2

| | | Tensile strength (Mpa) | Yield strength (Mpa) | Young's Modulus (Mpa) | Flexural Modulus (Mpa) | Notched Izod Impact (23° C.) (J/m) |
|---|---|---|---|---|---|---|
| Comp. Sheet Ex. 1 | PVC MB | 64.9 | 69.3 | 2880 | 3550 | 26.7 |
| Inv. Sheet Ex. 1 | PVCMB/FA 70/30 (wt %) | 54.1 | 45.0 | 1470 | 1960 | 1075.5 |
| Inv. Sheet Ex. 2 | PVCMB/FA 50/50 (wt %) | 42.3 | 38.0 | 940 | 1290 | 870.4 |

Test Methods

Test methods include the following:

Tensile strength, Yield strength, and Young's Modulus value are obtained according to ASTM D882. Flexural Modulus value is obtained according to ASTM D790. Notched Izod Impact value is obtained according to ASTM D256.

The glass transition temperature, Tg, of the acrylic polymers is in a TA Instruments Q1000 Differential Scanning calorimeter using a small sample of the polymer (5-20 mg) sealed in a small aluminum pan. The pan is placed in the DSC apparatus, and its heat flow response is recorded by scanning at a rate of 10° C./min from room temperature up to 180° C. The glass transition temperature is observed as a distinct shift in the heat flow curve.

The present invention may be embodied in other forms without departing from the spirit and the essential attributes thereof, and, accordingly, reference should be made to the appended claims, rather than to the foregoing specification, as indicating the scope of the invention.

I claim:

1. A polymer blend comprising:
    (1) from 20 to 90 parts by weight, based on the total weight of the polymer blend, polyvinyl chloride resin; and
    (2) from 10 to 80 parts by weight, based on the total weight of the polymer blend, a flexible acrylic polymer which comprises
        (a) a crosslinked core which comprises greater than 95 weight percent of units derived from one or more monomers selected from the group consisting of alkyl (meth)acrylate monomers, from 0.1 to 5 weight percent of units derived from a cross-linking monomer, graft-linking monomer, or combination thereof, and wherein the crosslinked core has a Tg of from −85 to −10° C.;
        (b) an intermediate region which comprises one or more intermediate layers, wherein each of the intermediate layers comprises from 88.5 to 100 weight percent of units derived from a one or more monomers selected from the group consisting of alkyl (meth)acrylate monomers, from 0 to 5 weight percent of units derived from a cross-linking monomer, a graft-linking monomer, or a combination of two or more thereof, optionally from 0 to 2.0 weight percent units derived from one or more chain transfer agents; wherein there is a compositional gradient between the intermediate layers and said compositional gradient transitions between a lower Tg and an upper Tg, wherein said lower Tg is at least −30° C. and said upper Tg is 70° C. or less, and
        (c) an outermost layer which comprises from 98.5 to 100 weight percent units derived from one or more monomers selected from the group consisting of alkyl (meth)acrylate, styrenic monomers, and combinations of two or more thereof, from 0 to 1.5 weight percent units derived from one or more chain transfer agents, and has a Tg of from 40° C. to 110° C.

2. The polymer blend according to claim 1, wherein the flexible acrylic polymer exhibits one or more of the following properties: (a) a Tg of from 50 to 97° C. of the outermost layer; (b) a Tg of from −55 to −30° C. of the crosslinked core.

3. The polymer blend according to claim 1, wherein the alkyl (meth)acrylate monomers of the crosslinked core are selected from the group consisting of butyl acrylate, ethyl hexyl acrylate, ethyl acrylate, methyl methacrylate, and combinations of two or more thereof.

4. The polymer blend according to claim 1, wherein the alkyl (meth)acrylate monomers of the intermediate layer(s) are selected from the group consisting of butyl acrylate, ethyl hexyl acrylate, ethyl acrylate, methyl methacrylate, cyclohexyl (meth)acrylate, cyclopentyl methacrylate, tetrahydrofurfyl methacrylate, benzyl (meth)acrylate and combinations of two or more thereof.

5. The polymer blend according to claim 1, wherein the alkyl (meth)acrylate monomers of the outermost layer are selected from the group consisting of butyl acrylate, ethyl hexyl acrylate, ethyl acrylate, methyl methacrylate, and combinations of two or more thereof.

6. The polymer blend according to claim 1, wherein the crosslinked core comprises at least 95 weight percent units of butyl acrylate and from 0.1 to 5.0 weight percent units of a combination of butanediol diacrylate and allyl methacrylate.

7. The polymer blend according to claim 1, wherein the one or more intermediate layers each comprise units derived from butyl acrylate and methyl methacrylate.

8. The polymer blend according to claim 1, wherein the one or more intermediate layers each comprise units derived from ethyl acrylate and methyl methacrylate.

9. The polymer blend according to claim 1, wherein the outermost layer comprises greater than 95 weight percent units derived from a combination of ethyl acrylate and methyl methacrylate monomers.

10. A film or sheet produced from the polymer blend according to claim 1.

11. The film or sheet according to claim 10, wherein the film or sheet has a thickness from 200 to 400 microns.

12. A capstock formed from the film or sheet according to claim 10.

13. A pipe produced from the polymer blend according to claim 1.

14. A method of preparing a film or sheet comprising: selecting a polymer blend which comprises:
    (1) from 20 to 90 percent by weight, based on the total weight of the polymer blend, polyvinyl chloride resin; and
    (2) from 10 to 80 percent by weight, based on the total weight of the polymer blend, a flexible acrylic polymer which comprises
        (a) a crosslinked core which comprises greater than 95 weight percent of units derived from one or more monomers selected from the group consisting of alkyl (meth)acrylate monomers, from 0.1 to 5 weight percent of units derived from a cross-linking monomer, graft-linking monomer, or combination thereof, and wherein the crosslinked core has a Tg of from −85 to −10° C.;
        (b) an intermediate region which comprises one or more intermediate layers, wherein each of the intermediate layers comprises from 88.5 to 100 weight percent of units derived from a one or more monomers selected from the group consisting of alkyl (meth)acrylate monomers, from 0 to 5 weight percent of units derived from a cross-linking monomer, a graft-linking monomer, or a combination of two or more thereof, optionally from 0 to 2.0 weight percent units derived from one or more chain transfer agents; wherein there is a compositional gradient between the intermediate layers and said compositional gradient transitions between a lower Tg and an upper Tg, wherein said lower Tg is at least −30° C. and said upper Tg is 70° C. or less, and
        (c) an outermost layer which comprises from 98.5 to 100 weight percent units derived from one or more monomers selected from the group consisting of alkyl (meth)acrylate, styrenic monomers, and combinations of two or more thereof, from 0 to 1.5 weight percent units derived from one or more chain transfer agents, and has a Tg of from 40° C. to 110° C.; and forming the polymer blend into a film or sheet by one or more process selected from the group consisting of calendaring, cast extrusion and injection molding.

15. A method of preparing a pipe comprising:

selecting a polymer blend which comprises:
(1) from 20 to 90 percent by weight, based on the total weight of the polymer blend, polyvinyl chloride resin; and
(2) from 10 to 80 percent by weight, based on the total weight of the polymer blend, a flexible acrylic polymer which comprises
   (a) a crosslinked core which comprises greater than 95 weight percent of units derived from one or more monomers selected from the group consisting of alkyl (meth)acrylate monomers, from 0.1 to 5 weight percent of units derived from a crosslinking monomer, graft-linking monomer, or combination thereof, and wherein the crosslinked core has a Tg of from −85 to −10° C.;
   (b) an intermediate region which comprises one or more intermediate layers, wherein each of the intermediate layers comprises from 88.5 to 100 weight percent of units derived from a one or more monomers selected from the group consisting of alkyl (meth)acrylate monomers, from 0 to 5 weight percent of units derived from a cross-linking monomer, a graft-linking monomer, or a combination of two or more thereof, optionally from 0 to 2.0 weight percent units derived from one or more chain transfer agents; wherein there is a compositional gradient between the intermediate layers and said compositional gradient transitions between a lower Tg and an upper Tg, wherein said lower Tg is at least −30° C. and said upper Tg is 70° C. or less, and
   (c) an outermost layer which comprises from 98.5 to 100 weight percent units derived from one or more monomers selected from the group consisting of alkyl (meth)acrylate, styrenic monomers, and combinations of two or more thereof, from 0 to 1.5 weight percent units derived from one or more chain transfer agents, and has a Tg of from 40° C. to 110° C.; and forming the polymer blend into a pipe by one or more process selected from the group consisting of extrusion and injection molding.

* * * * *